US012743417B2

(12) United States Patent
Cheng et al.

(10) Patent No.: US 12,743,417 B2
(45) Date of Patent: Sep. 22, 2026

(54) TEXT EMBEDDING GENERATION AND APPLICATIONS

(71) Applicant: Google LLC, Mountain View, CA (US)

(72) Inventors: Xi Cheng, Kirkland, WA (US); Wen Zhang, Bellevue, WA (US); Jiashang Liu, Kirkland, WA (US); Mingge Deng, Kirkland, WA (US); Amir Hormati, Mountain View, CA (US); Omid Fatemieh, Bellevue, WA (US)

(73) Assignee: Google LLC, Mountain View, CA (US)

( * ) Notice: Subject to any disclaimer, the term of this patent is extended or adjusted under 35 U.S.C. 154(b) by 231 days.

(21) Appl. No.: 18/484,661

(22) Filed: Oct. 11, 2023

(65) Prior Publication Data

US 2025/0124026 A1 Apr. 17, 2025

(51) Int. Cl.

*G06F 16/2452* (2019.01)
*G06F 16/242* (2019.01)
*G06F 40/40* (2020.01)

(52) U.S. Cl.

CPC .... *G06F 16/24522* (2019.01); *G06F 16/2433* (2019.01); *G06F 40/40* (2020.01)

(58) Field of Classification Search

CPC . G06F 16/24522; G06F 16/2433; G06F 40/40
See application file for complete search history.

(56) References Cited

U.S. PATENT DOCUMENTS 11,023,675 B1 * 6/2021 Neervannan .......... G06F 40/211
11,030,484 B2 * 6/2021 Walters ................ G06N 3/0985
11,847,406 B1 * 12/2023 Mallya Kasaragod ...................... G06F 40/30
2019/0146970 A1 * 5/2019 Chamieh ........... G06F 16/24524 707/718

(Continued)

FOREIGN PATENT DOCUMENTS

CN 116502263 A 7/2023

OTHER PUBLICATIONS

Mishra, Scaling up Models and Data with t5x and seqio, 2022, arXiv, whole document (Year: 2022).*

(Continued)

*Primary Examiner* — Sonia L Gay
(74) *Attorney, Agent, or Firm* — Shumaker & Sieffert, P.A.

(57) ABSTRACT

A method includes receiving a text embedding generation query from a user requesting generation of a text embedding for one or more data elements stored at a data warehouse. In response, the method includes selecting, using the text embedding generation query, a text embedding model from a plurality of different text embedding models. The method includes generating, using the selected text embedding model, the text embedding for the one or more data elements and storing the text embeddings at the data warehouse. The method includes receiving a machine learning model training query from the user device requesting training of a machine learning model using the text embeddings. In (Continued)

response to receiving the machine learning model training query, the method includes training the machine learning model using the text embeddings. The method includes providing, to the user device, a notification indicating that training of the machine learning model is complete.

20 Claims, 5 Drawing Sheets

(56) References Cited

U.S. PATENT DOCUMENTS

2023/0237636 A1* 7/2023 Osunkwo .............. G06T 7/0004
382/141
2023/0316082 A1* 10/2023 Mishra ..................... G06N 3/09
2023/0421629 A1* 12/2023 Ezrielev .................... G06F 1/03
2024/0020536 A1* 1/2024 Ling ......................... G06N 3/08
2024/0111794 A1* 4/2024 Osuala ................ G06F 16/3323
2025/0111159 A1* 4/2025 Huang .................... G06F 40/35

OTHER PUBLICATIONS

Unlocking the Potential of AI: How Databricks Dolly is Democratizing LLMs, https://rajanieshkaushikk.com/2023/05/1 0/unlocking-the-potential-of-ai-how-data bricks-dolly-is-democratizing-llms/#how- databricks-can-address-these-challenges, Rajaniesh, May 10, 2023.

Integrate LLM workflows with Knowledge Graph using Neo4j and APOC, <https://towardsdatascience.com/integrate-llm-workflows-with-knowledge-graph-using-neo4j-and-apoc-27ef7e9900a2>, Tomaz Bratanic Jun. 7, 2023.

Introducing BigQuery Text Embeddings for NLP Task. Wen Zhang et al. Aug. 25, 2023.

"MachineSpec", Google, Jul. 22, 2025, 4 pp., Retrieved from the Internet on Aug. 29, 2025 from URL: https://cloud.google.com/vertex-ai/docs/reference/rest/v1/MachineSpec.

"Supported input feature types", Google, Aug. 25, 2025, 1 pp., Retrieved from the Internet on Aug. 27, 2025 from URL: https://cloud.google.com/bigquery/docs/input-feature-types.

"Vector Search", Google, Aug. 29, 2025, 11 pp., Retrieved from the Internet on Aug. 29, 2025 from URL: https://cloud.google.com/vertex-ai/docs/vector-search/overview.

Lin et al., "Announcing BigQuery and BigQuery ML operators for Vertex AI Pipelines", Google, Apr. 5, 2022, 9 pp., Retrieved from the Internet on Aug. 27, 2025 from URL: https://cloud.google.com/blog/topics/developers-practitioners/announcing-bigquery-and-bigquery-ml-operators-vertex-ai-pipelines.

Wetherbee, "Google Patents Public Datasets: connecting public, paid, and private patent data", Google, Oct. 31, 2017, 12 pp., Retrieved from the Internet on Aug. 27, 2025 from URL: https://cloud.google.com/blog/topics/public-datasets/google-patents-public-datasets-connecting-public-paid-and-private-patent-data.

* cited by examiner

TEXT EMBEDDING GENERATION AND APPLICATIONS

TECHNICAL FIELD

This disclosure relates to text embedding generation and applications.

BACKGROUND

Embeddings are dense numerical representations of high-dimensional discrete data (e.g., words, sounds, images) in a low-dimensional space, expressed as vectors. Word embeddings specifically, translate words and sentences to float vectors so that programs can read and process. Word embeddings can account for relationships, therefore words with similar semantic and syntactic meanings have similar values. Embeddings are widely used in natural language processing (NLP) tasks such as text/document classification, sentiment analysis, information retrieval, language translation, and many more.

SUMMARY

One aspect of the disclosure provides a method for text embedding generation and applications. The computer-implemented method, when executed by data processing hardware, causes the data processing hardware to perform operations. The operations include receiving a text embedding generation query from a user device associated with a user. The text embedding generation query requests the data processing hardware generate a text embedding for each of one or more data elements stored at a data warehouse. In response to receiving the text embedding generation query, the operations include selecting, using the text embedding generation query, a text embedding model from a plurality of different text embedding models. The operations also include generating, using the selected text embedding model, the text embedding for each of the one or more data elements and storing the text embedding for each of the one or more data elements at the data warehouse. The operations include receiving a machine learning model training query from the user device. The machine learning model training query requests the data processing hardware train a machine learning model using the text embedding for each of the one or more data elements. In response to receiving the machine learning model training query, the operations include training the machine learning model using the text embedding for each of the one or more data elements and providing, to the user device, a notification indicating that training of the machine learning model is complete.

Implementations of the disclosure may include one or more of the following optional features. In some implementations, the text embedding generation query includes a Structured Query Language (SQL) query. The text embedding generation query may include a first Structured Query Language (SQL) query and the machine learning model training query includes a second SQL query. In some of these examples, the first SQL query and the second SQL query are the same.

In some implementations, the text embedding generation query includes a cost threshold and selecting the text embedding generation model is based on the cost threshold. The text embedding generation query may include a quality threshold and selecting the text embedding generation model may be based on the quality threshold. In some examples, the operations further include fine-tuning the selected text embedding model using one or more data elements stored at the data warehouse.

Optionally, at least one of the plurality of different text embedding models includes a language model. At least one of the plurality of different text embedding models may include a large language model. In some implementations, the operations further include receiving a model prediction query from the user device requesting the data processing hardware generate a prediction using the trained machine learning model; retrieving inference data from the data warehouse; generating, using the trained machine learning model and the inference data, the prediction; and providing, to the user device, the prediction.

Another aspect of the disclosure provides a system for text embedding generation and applications. The system includes data processing hardware and memory hardware in communication with the data processing hardware. The memory hardware stores instructions that when executed on the data processing hardware cause the data processing hardware to perform operations. The operations include receiving a text embedding generation query from a user device associated with a user. The text embedding generation query requests the data processing hardware generate a text embedding for each of one or more data elements stored at a data warehouse. In response to receiving the text embedding generation query, the operations include selecting, using the text embedding generation query, a text embedding model from a plurality of different text embedding models. The operations also include generating, using the selected text embedding model, the text embedding for each of the one or more data elements and storing the text embedding for each of the one or more data elements at the data warehouse. The operations include receiving a machine learning model training query from the user device. The machine learning model training query requests the data processing hardware train a machine learning model using the text embedding for each of the one or more data elements. In response to receiving the machine learning model training query, the operations include training the machine learning model using the text embedding for each of the one or more data elements and providing, to the user device, a notification indicating that training of the machine learning model is complete.

This aspect may include one or more of the following optional features. In some implementations, the text embedding generation query includes a Structured Query Language (SQL) query. The text embedding generation query may include a first Structured Query Language (SQL) query and the machine learning model training query includes a second SQL query. In some of these examples, the first SQL query and the second SQL query are the same.

In some implementations, the text embedding generation query includes a cost threshold and selecting the text embedding generation model is based on the cost threshold. The text embedding generation query may include a quality threshold and selecting the text embedding generation model may be based on the quality threshold. In some examples, the operations further include fine-tuning the selected text embedding model using one or more data elements stored at the data warehouse.

Optionally, at least one of the plurality of different text embedding models includes a language model. At least one of the plurality of different text embedding models may include a large language model. In some implementations, the operations further include receiving a model prediction query from the user device requesting the data processing hardware generate a prediction using the trained machine learning model; retrieving inference data from the data warehouse; generating, using the trained machine learning model and the inference data, the prediction; and providing, to the user device, the prediction.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Embeddings are dense numerical representations of high-dimensional discrete data (e.g., words, sounds, images) in a low-dimensional space, expressed as vectors. Word embeddings specifically, translate words and sentences to float vectors so that programs can read and process. Word embeddings can account for relationships, therefore words with similar semantic and syntactic meanings have similar values. Embeddings are widely used in natural language processing (NLP) tasks such as text/document classification, sentiment analysis, information retrieval, language translation, and many more.

There are many different text embedding techniques. Bag-of words is perhaps the simplest and most well-known text encoding method, which turns arbitrary text into fixed-length vectors. Bag-of-words first determines vocabulary by collecting all words in the set of documents and then, for a particular document, counts how many times each word appears. Other popular methods include TF-IDF (the product of term frequency and inverse document frequency), co-occurrence matrix techniques, neural network-based techniques, recurrent neural network-based techniques, and transformed-based techniques. These different techniques offer different advantages and disadvantages when it comes to scalability, embedding quality, and cost (e.g., computational resources and/or time).

Text embeddings have now become a key enabler and building block for many applications, such as recommendation systems, text clustering, and named entity extractions. Despite recent advances in text embeddings, there is no existing solution to provide scalable embedding generation and downstream modeling functionalities on cloud enterprise database systems.

Implementations herein are directed toward a text embedding generation system that allows a user to select from multiple different embedding generation models and then brings the selected model "to the data." The text embedding system includes a data warehouse that houses data for users, allowing the users to perform text embedding generation and application tasks directly from the data warehouse without having to migrate the data or deal with specialized models.

Figure 1:
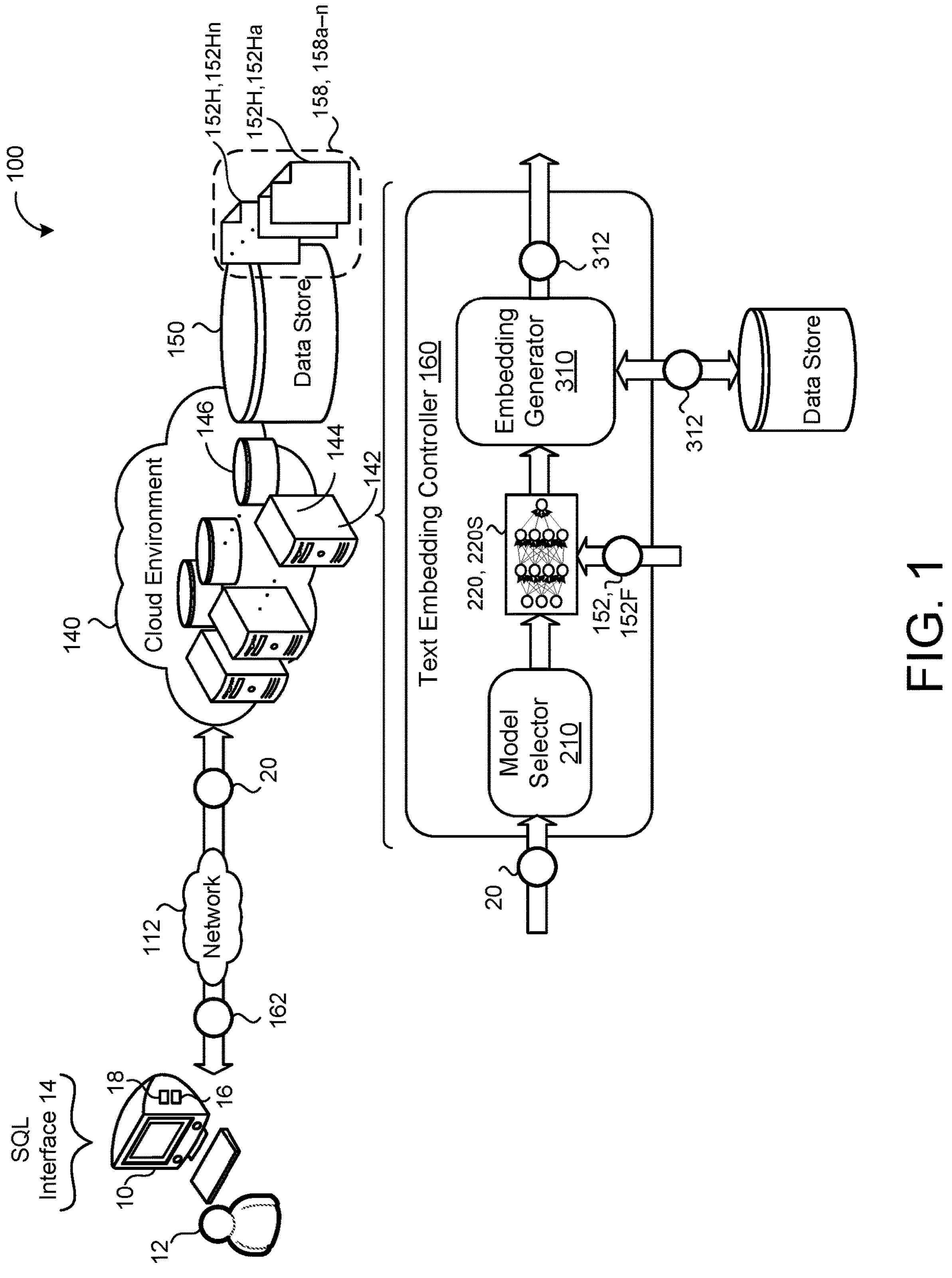
FIG. 1 is a schematic view of an example system for text embedding generation and applications.

Referring now to FIG. 1, in some implementations, an example text embedding system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 (i.e., a data warehouse 150) is configured to store a plurality of data elements 152, 152*a-n* within, for example, one or more tables 158, 158*a-n* (i.e., a cloud database). The data store 150 may store any number of tables 158 at any point in time.

The remote system 140 is configured to receive a text embedding generation query 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the text embedding generation query 20 using a Structured Query Language (SQL) interface 14. The text embedding generation query 20 requests the remote system 140 to generate a text embedding 312 for each of one or more data elements 152 stored at a data warehouse 150. Each text embedding 312 is a numerical representation of the text of the corresponding data element 152 where each word or phrase is represented as a dense vector of real numbers. In some examples, the text embeddings 312 are encoded such that similar words are closer together in the vector space.

The remote system executes a text embedding controller 160. The text embedding controller 160 receives the text embedding generation query 20 from the user 12. The text embedding controller 160 may include a model selector 210. As discussed in more detail below, in response to receiving the text embedding generation query 20, the model selector 210 selects, using the text embedding generation query 20, a text embedding model 220, 220S from a plurality of different text embedding models 220.

The text embedding controller 160 also includes an embedding generator 310. The embedding generator 310 generates, using the selected text embedding model 220S, the text embedding 312 for each requested data element 152. The embedding generator 310 may store the text embeddings 312 back at the data store 150 (i.e., the data warehouse 150). In this way, the user 12 is able to generate text embeddings 312 for data elements 152 stored at the data warehouse 150 (e.g., via an SQL query) without having to migrate the data out of the data warehouse 150 or import a specialized model. Instead, the text embedding controller 160 "brings the model to the data" by natively integrating multiple text embedding models 220 for the user 12 to choose from. The SQL interface 14 provides a powerful and well known interface for users 12 to interact with. The SQL query (e.g., the text embedding generation query 20) may include a create model command, a number of options for creating the model (e.g., a type of model, a batch size, a dropout value, a quantity of hidden units, an identification label, a learning rate, a number of training iterations, and/or a structure defining the text embeddings 312), and a select statement selecting the table to use for the data elements 152.

The data elements 152 may include categorical features, numerical features, and/or text. The embedding generator 310, in some implementations, differentiates between categorical features and text features based on a number of words threshold in the data element (e.g., over five words indicates text) and a total percentage of rows (i.e., from a table 158) that exceed the number of words threshold. Additionally or alternatively, the embedding generator 310 differentiates the data elements 152 based on a percentage of unique data elements 152 (i.e., a high percentage of unique data elements 152 indicates a higher likelihood of text features).

Figure 2:
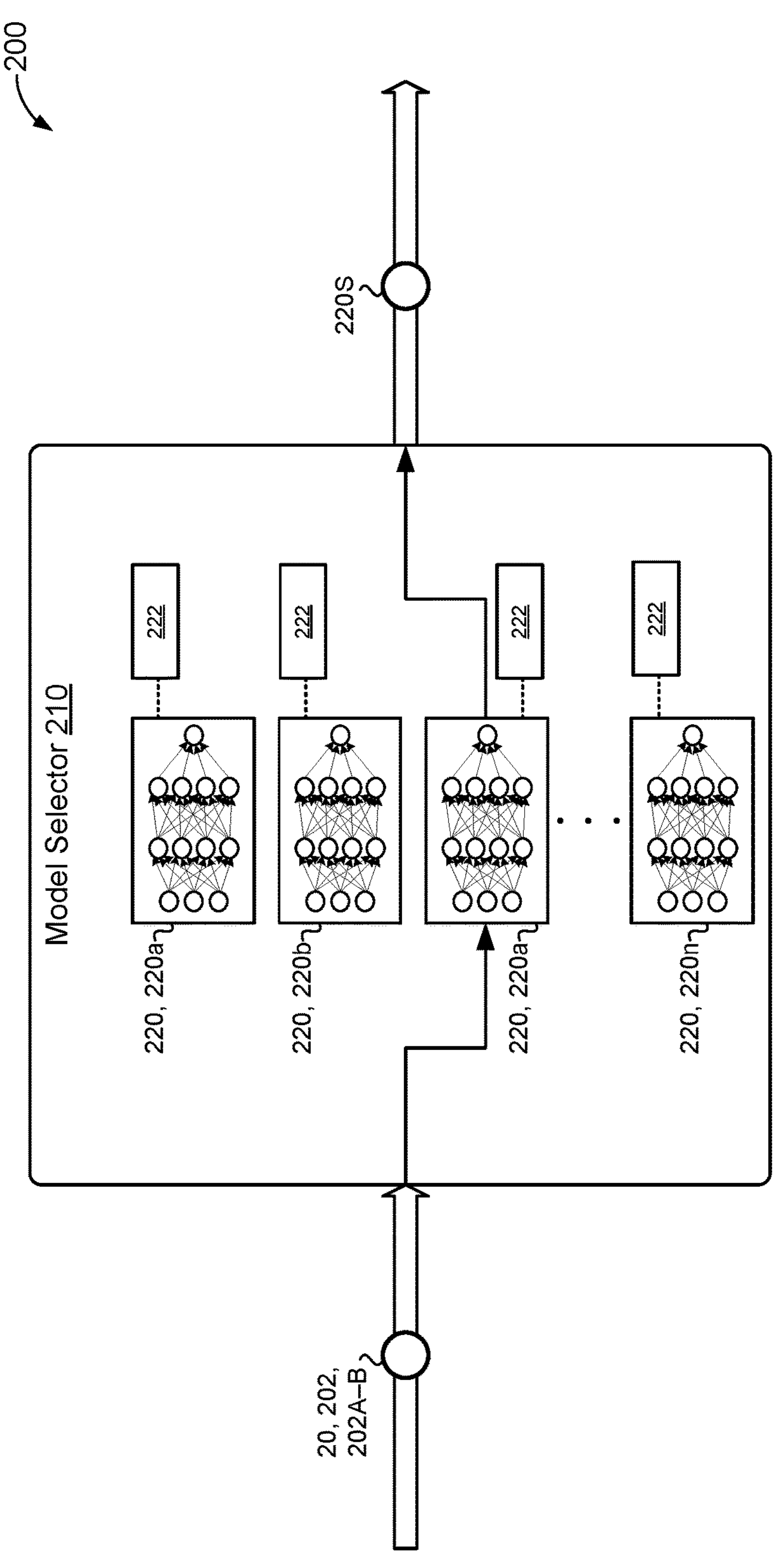
FIG. 2 is a schematic view of an exemplary model selector of the system of FIG. 1.

Referring now to FIG. 2, a schematic view 200 includes an exemplary model selector 210. Here, the model selector 210 has a plurality of text embedding models 220, 220*a-n* to choose from, and each text embedding model 220 can be brought to the data at the data warehouse 150. The model selector 210, using the text embedding generation query 20, selects one of the available text embedding models 220. The selected text embedding model 220S is provided to the embedding generator 310 (FIG. 1).

In some examples, the text embedding generation query 20 specifically indicates which text embedding model 220 for the model selector 210 to select. For example, the text embedding generation query 20 indicates that the model selector 210 should select a language model such as a large language model (LLM) text embedding model 220. In another example, the text embedding generation query 20 indicates that the model selector 210 should select a bidirectional encoder representation from transformers (BERT) language model.

In other examples, the text embedding generation query 20 does not specify a particular text embedding model 220, but instead includes or indicates one or more thresholds 202, such as a cost threshold 202, 202A and/or a quality threshold 202, 202B. In these examples, each text embedding model 220 is associated with one or more model parameters 222 that represent a cost (e.g., a computational cost, an amount of time, and/or an amount of money) attributed to use of the text embedding model 220 and/or a quality (i.e., a quality of the generated text embeddings 312) of the text embedding model 220. The model selector 210 may evaluate the parameters 222 and the thresholds 202 to select the text embedding model 220 based on the thresholds 202 (e.g., the cost threshold 202A and/or the quality threshold 202B). For example, the model selector 210 uses a cost function or the like to evaluate the thresholds 202 and the parameters 222. This allows the user 12 to balance scalability, cost, and embedding quality without requiring an understanding of each text embedding model 220 offered by the model selector 210.

In some implementations, the model selector 210 adjusts or fine-tunes the selected text embedding model 220S using one or more data elements 152 stored at the data warehouse 150. For example, the model selector 210 may freeze the weights of one or more early layers in the pre-trained selected text embedding model 220S, add any required task-specific output layers, and train the output layers using a relatively small domain-specific training data set pulled from the data store 150. Optionally, the model selector 210 may unfreeze the layers of the base selected text embedding model 220S and retrain the selected text embedding model 220S with a small learning rate to avoid fast overfitting. The model selector 210 may store the fine-tuned selected text embedding model 220S for later use at the data warehouse 150 (e.g., store the final weights of the selected text embedding model 220S).

Figure 3:
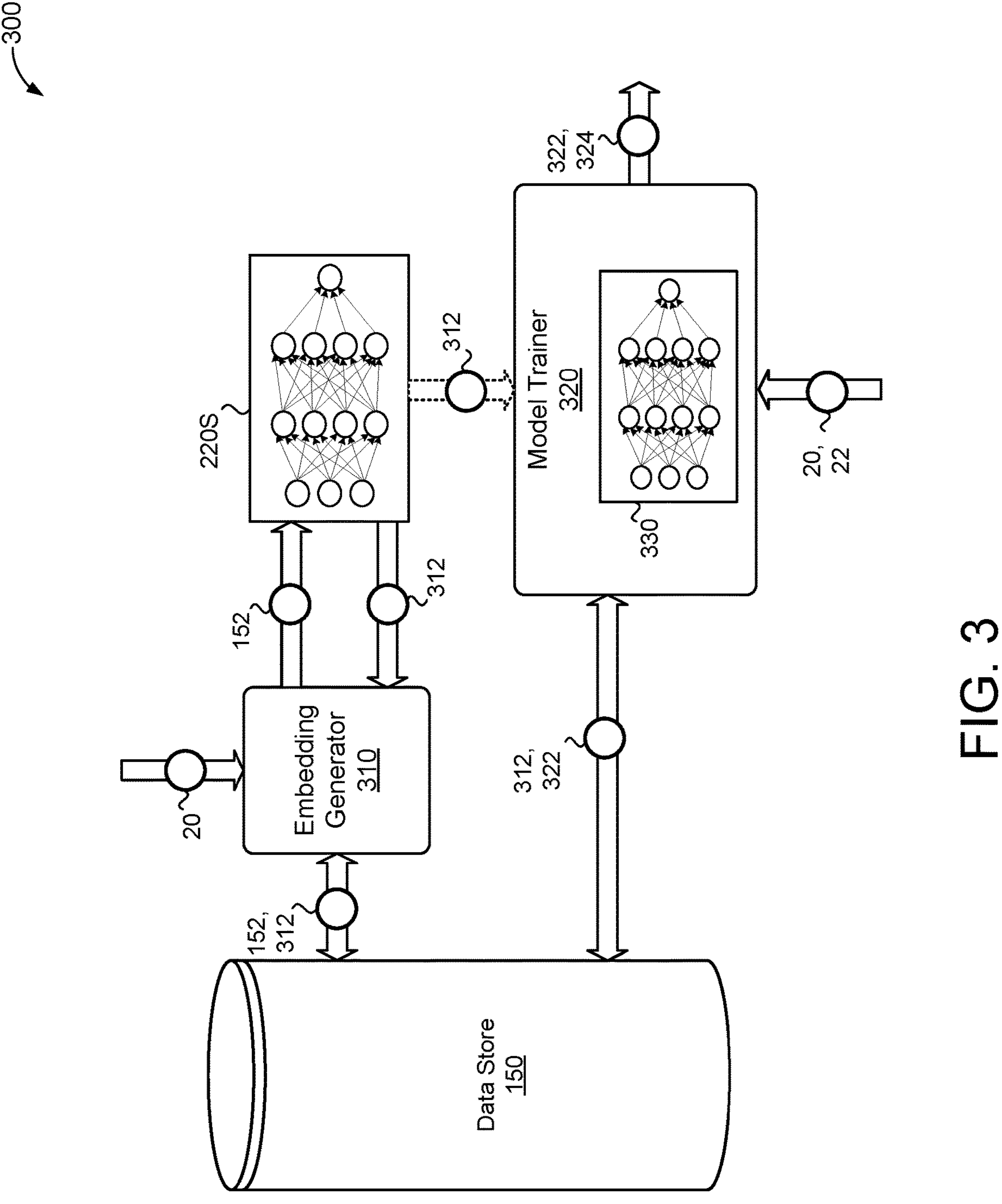
FIG. 3 is a schematic view of exemplary components of the system of FIG. 1.

Referring now to FIG. 3, a schematic view 300 includes an exemplary embedding generator 310. Here, the embedding generator 310 uses the selected text embedding model 220S to generate the text embeddings 312 from the data elements 152. The embedding generator 310 may store the generated text embeddings 312 back at the data store 150 (i.e., the same data warehouse 150 that stores the data elements 152).

Optionally, the text embedding controller 160 includes a model trainer 320. The model trainer 320 receives a machine learning model training query 22 from the user device 10. In some examples, the machine learning model training query 22 is part of the text embedding generation query 20 (e.g., part of the same SQL query as the text embedding generation query 20 and thus received simultaneously). In other examples, the machine learning model training query 22 is a separate query received after the text embeddings 312 have been generated by the embedding generator 310 (e.g., the text embedding generation query 20 is a first SQL query and the machine learning model training query 22 is a second SQL query received after the first SQL query). The machine learning model training query 22 requests that the model trainer 320 train a machine learning model 330 using the text embeddings 312 generated from the data elements 152.

The model trainer 320, in response to the machine learning model training query 22, trains the machine learning model 330 using the generated text embeddings 312. In some implementations, the model trainer 320 retrieves the text embeddings 312, based on the machine learning model training query 22, directly from the data store 150. In other examples, the model trainer 320 receives or obtains the text embeddings 312 directly from the selected text embedding model 220S. The model trainer 320 may use all of the text embeddings 312 or only a portion of the text embeddings 312 based on parameters in the machine learning model training query 22, parameters of the machine learning model 330, or other considerations. The machine learning model 330 may be trained for any of a variety of tasks, such as classification, regression, clustering, semantic search, etc.

The trained machine learning model 330 may generate one or more predictions 322 (e.g., from text embeddings 312 provided by the selected text embedding model 220S) that are stored at the data store 150. The model trainer 320 may generate and provide, to the user device 10, a notification 324 indicating that training of the machine learning model 330 is complete. The notification 324 may also include one or more predictions 322 generated by the trained machine learning model 330. For example, the text embedding generation query 20 or the machine learning model training query 22 additionally include a request to generate predictions using one or more data elements 152 (i.e., inference data) and the trained machine learning model 330. Accordingly, after selecting the text embedding model 220S and training the machine learning model 330, the text embedding controller 160 may generate the predictions 322 from the inference data and provide, to the user device 10, the prediction(s) 322. Additionally or alternatively, the predictions 322 are stored at the data store 150.

Thus, the text embedding system 100 provides an end-to-end solution for users 12 to generate text embeddings 312 from data elements 152 stored at a data warehouse 150 and then use the generated text embeddings 312 in downstream machine learning applications, all without having to migrate the data elements 152 outside of the data warehouse 150 or import specialized tools. The text embedding system 100 may provide an SQL-syntax interface inside a distributed computing environment (e.g., a cloud database system). The text embedding system 100 allows the user 12 to select from any number of state of the art text embedding models such as LLMs. This allows the user 12 to balance scalability, embedding quality, and cost based on the user's needs, desires, and available resources. The text embedding system 100 offers high scalability by leveraging a cloud computing environment, which offers high parallelization for text embedding generation by distributing the effort across any number of machines simultaneously. The text embedding system 100 seamlessly embeds applications in downstream machine learning modeling. That is, the generated text embeddings 312 may be seamlessly used to train a variety of machine learning models 330 right from the data warehouse 150. Thus, the text embedding system 100 offers a fully managed cloud database service fully orchestrated without the required attention of users 12.

Figure 4:
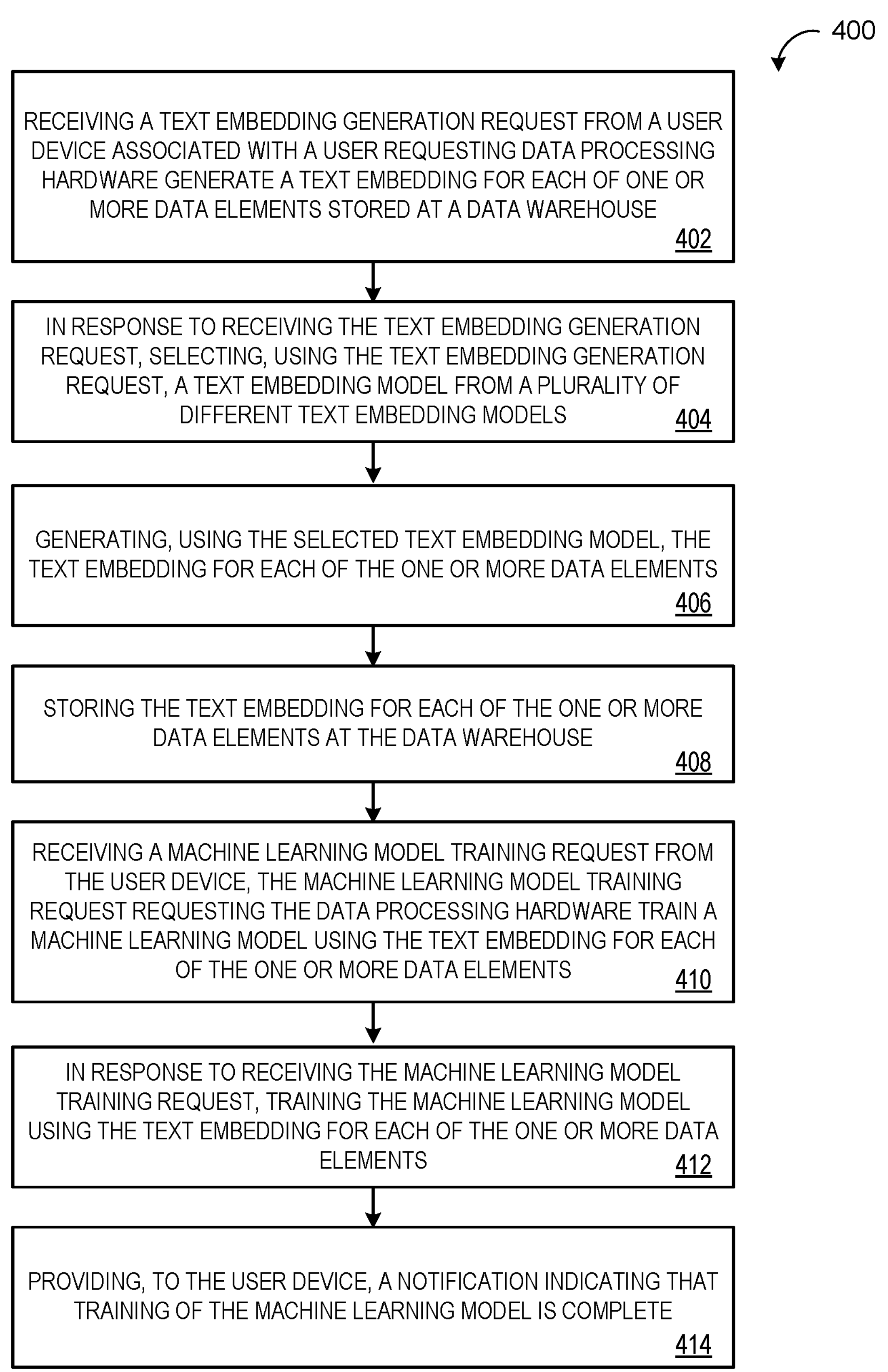
FIG. 4 is a flowchart of an example arrangement of operations for a method for text embedding generation and applications.

FIG. 4 is a flowchart of an exemplary arrangement of operations for a method 400 for text embedding generation and applications. The computer-implemented method 400, when executed by data processing hardware 144, causes the data processing hardware 144 to perform operations. The method 400, at operation 402, includes receiving a text embedding generation query 20 from a user device 10 associated with a user 12. The text embedding generation query 20 requests the data processing hardware 144 generate a text embedding 312 for each of one or more data elements 152 stored at a data warehouse 150. In response to receiving the text embedding generation query 20, the method 400, at operation 404, includes selecting, using the text embedding generation query 20, a text embedding model 220S from a plurality of different text embedding models 220. The method 400, at operation 406, includes generating, using the selected text embedding model 220S, the text embedding 312 for each of the one or more data elements 152 and, at operation 408, storing the text embedding 312 for each of the one or more data elements 152 at the data warehouse 150. At operation 410, the method 400 includes receiving a machine learning model training query 22 from the user device 10. The machine learning model training query 22 requests the data processing hardware 144 to train a machine learning model 330 using the text embedding 312 for each of the one or more data elements 152. The method 400, at operation 412, in response to receiving the machine learning model training query 22, includes training the machine learning model 330 using the text embedding 312 for each of the one or more data elements 152. At operation 414, the method 400 includes providing, to the user device 10, a notification 324 indicating that training of the machine learning model 330 is complete.

Figure 5:
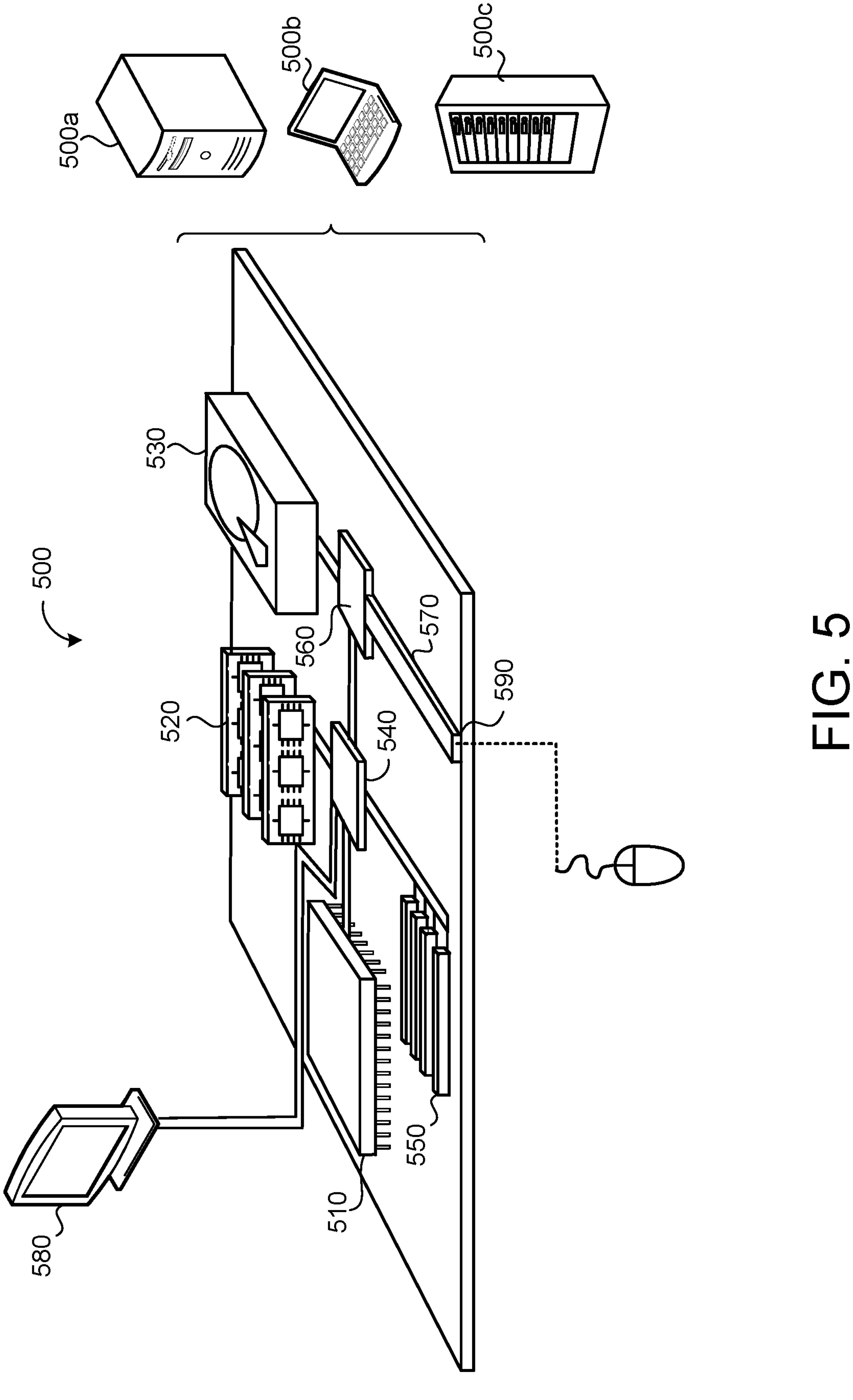
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:

receiving, by data processing hardware and from a client device, a text embedding generation query requesting the data processing hardware:

generate, based on a computational cost threshold, a text embedding for each data element of a plurality of data elements stored at a data warehouse; and train a machine learning model using the text embeddings;

responsive to receiving the text embedding generation query, selecting, by the data processing hardware and using the computational cost threshold, a text embedding model from a plurality of different text embedding models integrated in the data warehouse;

generating, by the data processing hardware and using the text embedding model, the text embedding for each data element of the plurality of data elements, wherein the text embedding model executes within the data warehouse without migrating the plurality of data elements out of the data warehouse;

training, by the data processing hardware and using the text embeddings, the machine learning model; and after training the machine learning model, storing, by the data processing hardware, the machine learning model at the data warehouse.

2. The method of claim 1, wherein the text embedding generation query comprises a Structured Query Language (SQL) query.

3. The method of claim 1, wherein the text embedding generation query further requests the data processing hardware generate the text embedding based on a quality threshold.

4. The method of claim 1, further comprising fine-tuning the text embedding model using one or more data elements stored at the data warehouse.

5. The method of claim 1, wherein at least one of the plurality of different text embedding models comprises a large language model.

6. The method of claim 1, further comprising:

receiving, by the data processing hardware, a model prediction query from the client device, the model prediction query requesting the data processing hardware generate a prediction using the trained machine learning model;

retrieving, by the data processing hardware, inference data from the data warehouse;

generating, by the data processing hardware and using the trained machine learning model and the inference data, the prediction; and providing, by the data processing hardware and to the client device, the prediction.

7. A system comprising:

data processing hardware; and memory hardware in communication with the data processing hardware, the memory hardware storing instructions that when executed on the data processing hardware cause the data processing hardware to:

receive, from a client device, a text embedding generation query requesting the data processing hardware:

generate, based on a computational cost threshold, a text embedding for each data element of a plurality of data elements stored at a data warehouse; and train a machine learning model using the text embeddings;

responsive to receiving the text embedding generation query, select, using the computational cost threshold, a text embedding model from a plurality of different text embedding models integrated in the data warehouse;

generate, using the text embedding model, the text embedding for each data element of the plurality of data elements, wherein the text embedding model executes within the data warehouse without migrating the plurality of data elements out of the data warehouse;

train, by the data processing hardware and using the text embeddings, the machine learning model; and after training the machine learning model, store the machine learning model at the data warehouse.

8. The system of claim 7, wherein the text embedding generation query comprises a Structured Query Language (SQL) query.

9. The system of claim 7, wherein the text embedding generation query further requests the data processing hardware generate the text embedding based on a quality threshold.

10. The system of claim 7, wherein the instructions further cause the data processing hardware to fine-tune the text embedding model using one or more data elements stored at the data warehouse.

11. The system of claim 7, wherein at least one of the plurality of different text embedding models comprises a large language model.

12. The system of claim 7, wherein the instructions further cause the data processing hardware to:

receive a model prediction query from the client device, the model prediction query requesting the data processing hardware generate a prediction using the trained machine learning model;

retrieve inference data from the data warehouse;

generate, using the trained machine learning model and the inference data, the prediction; and provide, to the client device, the prediction.

13. The method of claim 1, further comprising:

identifying, by the data processing hardware, a first subset of the data elements as text features based on a number of words threshold and a second subset of the data elements as categorical features; and generating, by the data processing hardware, the text embedding for the first subset of the data elements identified as text features.

14. The method of claim 1, wherein generating the text embedding for each data element of the plurality of data elements is performed in parallel across a distributed computing environment of the data processing hardware.

15. The method of claim 1, wherein the plurality of different text embedding models are presented to the client device via an interface that abstracts underlying model architectures, and wherein the computational cost threshold allows for model selection without specifying a particular model name or architecture.

16. The method of claim 1, wherein the text embedding generation query is a single query that causes the data processing hardware to execute an end-to-end workflow.

17. The system of claim 7, wherein the instructions further cause the data processing hardware to:

identify a first subset of the data elements as text features based on a number of words threshold and a second subset of the data elements as categorical features; and generate the text embedding for the first subset of the data elements identified as text features.

18. The system of claim 7, wherein generating the text embedding for each data element of the plurality of data elements is performed in parallel across a distributed computing environment of the data processing hardware.

19. The system of claim 7, wherein the plurality of different text embedding models are presented to the client device via an interface that abstracts underlying model architectures, and wherein the computational cost threshold allows for model selection without specifying a particular model name or architecture.

20. The system of claim 7, wherein the text embedding generation query is a single query that causes the data processing hardware to execute an end-to-end workflow.

* * * * *